UNITED STATES PATENT OFFICE.

CARLETON ELLIS, OF MONTCLAIR, NEW JERSEY, ASSIGNOR TO NATIONAL CARBON COMPANY, INC., OF NEW YORK, N. Y., A CORPORATION OF NEW YORK.

BATTERY AND DUPLEX ELEMENT THEREFOR.

1,331,456.               Specification of Letters Patent.       Patented Feb. 17, 1920.

No Drawing.      Application filed September 29, 1917. Serial No. 194,052.

*To all whom it may concern:*

Be it known that I, CARLETON ELLIS, a citizen of the United States, and a resident of Montclair, in the county of Essex and State of New Jersey, have invented certain new and useful Improvements in Batteries and Duplex Elements Therefor, of which the following is a specification.

This invention relates to batteries and battery containers comprising as one element zinc or similar positive metal incorporated with a supporting metal to form a duplex or composite element, all as will be more particularly hereinafter described and claimed.

The present invention is concerned especially with batteries of the Leclanche type, or those employing ammonium chlorid or ammonium nitrate and similar exciting fluids, but is not limited to such field. The invention, will, however, be described with reference to the Leclanche battery for illustrative purposes. In the ordinary Leclanche battery the elements are carbon and zinc, the exciting fluid, ammonium chlorid, and a depolarizing mass containing manganese dioxid is usually employed. In the dry battery the container is made of zinc, usually by cutting sheet zinc to the proper form and soldering to afford a cylinder, one end of which is closed by soldering in a bottom plate of zinc. Inside of this container is placed a lining of bibulous paper, within which is packed the carbon element, usually a cylindrical rod, and around the latter is a mixture of graphite and manganese dioxid. The bibulous paper and the contents of the container are moistened with a solution of ammonium chlorid, sometimes containing other ingredients, of one kind or another. In the present invention the zinc container is replaced by a duplex or composite metal consisting of zinc or similar metal supported on a metal preferably of a cheaper character, namely, sheet iron or steel. In the following description the term "sheet iron" will be used to embrace steel and similar metallic material.

The sheet iron is coated with zinc or similar metal, as for example, the zinc may be applied by a galvanizing method to coat both sides of the sheet. The side forming the exterior of the container may be very thinly galvanized, merely to afford a protection against oxidation, while the side intended for the interior of the container may be more heavily galvanized. For example, a sheet of ordinary galvanized iron may be heated to a point where the zinc coating is softened and molten zinc may be poured on one side and be spread out uniformly over the sheet so as to give a heavier zinc coating for the interior of the container. Or the container may be made up of sheet iron and then galvanized and a heavier coating applied to the interior of the container. Other methods which may be employed for the deposition of zinc are electro-plating processes, sherardizing or similar thermal processes (including those employed for coating iron with aluminum) which also may be used in the present case, with or without zinc, for special battery containers. Another method of applying zinc is by spraying the molten metal such for example, as the procedure known as the Schoop process. Ordinary galvanizing has a tendency to leave pin holes in the zinc coating, through which the ammonium chlorid could act upon the iron and cause rusting, while spraying molten zinc under high pressure on the galvanized zinc surface would tend to fill up all pin holes and make an impervious surface, thereby avoiding local action such as would be caused by a pervious zinc coating. The presence of iron would of course, be detrimental in a battery of this type and precaution should be taken to prevent rusting as well as the introduction of iron into the electrolyte, especially with batteries of the miniature type. In the latter case the coating may be applied by spraying or by other procedure as may be required for the particular battery in hand. Local applications may be made to give a heavier coating at some point. For example, in some batteries the zinc container is destroyed more rapidly in the lower part and a heavier application of zinc may be applied to the inside bottom and lower portion of the vertical wall to allow for such action at that point. Thus heavier coatings of zinc may be applied at the zones or places of greatest action. As stated, the side forming the exterior of the container may be very thinly galvanized, merely to afford protection against oxidation, while the interior surface carries a heavier zinc coating adapted to meet the requirements of the electrolytic action which is demanded at such surface.

In some cases sheet iron may be coated with zinc on one side and the iron left bare on the other side. The battery container is made up with the zinc on the inside and the outside may be coated if desired with asphaltum and the like for protection against rusting.

In dry batteries of the Leclanche type, two forms are commonly recognized, the large battery which is used for electric bell installations, automobile ignition systems, and the like, and the miniature battery for flashlight service. The large battery is usually made up with mineral manganese dioxid depolarizing agent or a depolarizer of the pyrolusite type, while the miniature batteries commonly employ hydrated manganese dioxid, prepared artificially. In either case the duplex metal container may be employed. Instead of soldering the joints to form a cup or container, the metal may be spun to shape from sheet iron and then galvanized or coated with zinc in any suitable manner. In this way soldering is avoided and a tight container obtained. In order to reduce rusting to a minimum a very pure form of sheet iron which is now made of a relatively acid-resisting quality may be employed as a support for the zinc.

The cup or container may be made of pure sheet iron or galvanized iron by soldering and a coating of zinc applied to the cup by means of spraying or similar process and when applied by spraying, the arrangement of the spraying apparatus may be such as to give a heavier coating of the zinc to and slightly above the bottom of the cup. Such a cup or any other container of the character described herein may be made up into a battery of the Leclanche type by lining the container with bibulous paper and introducing a carbon pencil surrounded by a mass of deplorazing material comprising manganese dioxid and graphite or other suitable form of carbon. The bibulous paper and the deplorizing mass are moistened with a solution comprising ammonium chlorid and the top of the cell is filled with wax, asphalt, pitch, or similar material.

In one case a dry battery was prepared according to one form of my invention by heating ordinary galvanized sheet iron over a gas flame and applying pieces of zinc to the upper surface. After the zinc melted it flowed along the surface and as the sheet was moved about over the flame the molten zinc would tend to follow the path of travel of the flame. Thus the zinc was distributed over the iron sheet. In this way a duplex metal sheet was prepared carrying more zinc on one side than on the other. On the surface having the heavier coating, the zinc was not equally distributed but was thicker on approximately one half of this surface than on the other half. This sheet was cut and rolled into the form of a cylinder and a cap of the same material soldered on the bottom. The cutting of the sheet was done so that the heavier coating of zinc was on the inside of the container and the thickest portion of this heavier coating was on the lower half of the cylinder and on the upper surface of the bottom of the container. This container was fitted with a central round of carbon rod, a bibulous paper lining was fitted against the side and bottom of the container and between the paper lining and carbon rod was packed a mixture of graphite and manganese dioxid. To the contents of this cell was added an exciting fluid containing ammonium chlorid. The cell exhibited an E. M. F. of approximately 1.45 volts.

What I claim is:—

1. A battery container for cells of the Leclanche type comprising sheet iron coated with zinc on the inside and outside, having a thicker coating of zinc on the inside surface.

2. A battery container comprising as one electrode galvanized iron the zinc coating of which is free from pinholes in all parts exposed to the electrolyte.

3. A battery container comprising a cup formed of galvanized iron and having a heavier coating of zinc on the inside than on the outside.

4. A battery container comprising an iron cup having a heavy coating of zinc directly formed upon it on the inside and acting as an electrode, said zinc coating being free from pinholes where exposed to the electrolyte, whereby local action, due to formation of iron compounds, is substantially prevented.

5. A galvanized iron cup for batteries of the Leclanche type having a sprayed coating of zinc on the inside, said coating being heavier at the bottom than at the top of the container.

6. A battery of the Leclanche type comprising a container of galvanized sheet iron having a coating of zinc directly superimposed on the galvanized surface, said container acting as an electrode, a carbon electrode, and, interposed between the carbon electrode and the container a mass of depolarizing material.

CARLETON ELLIS.